July 11, 1950
J. H. FORIEST
2,514,854
PEANUT STACKER
Filed Oct. 22, 1948
5 Sheets-Sheet 1
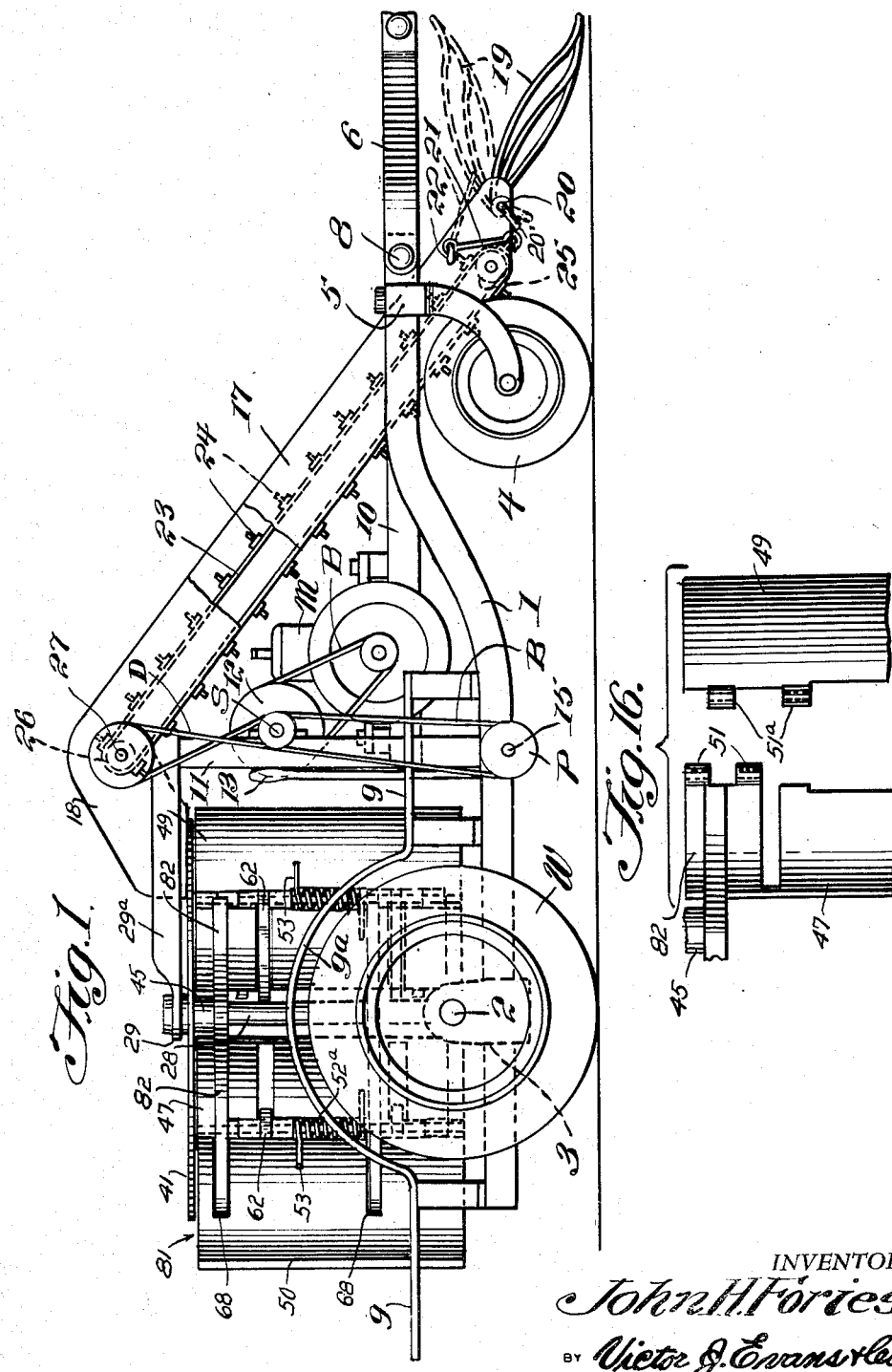
INVENTOR.
John H. Foriest,
BY Victor J. Evans & Co.
ATTORNEYS.

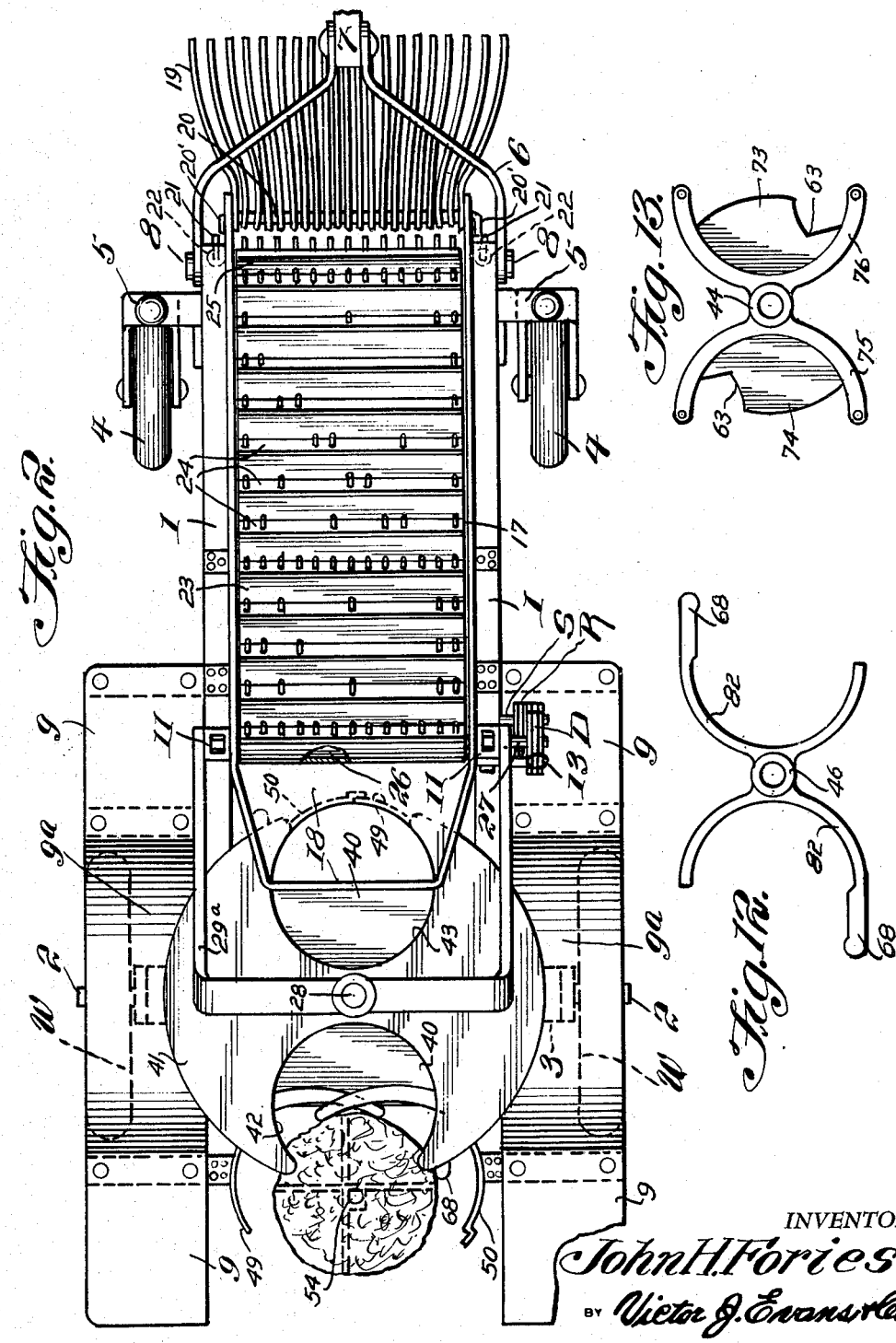

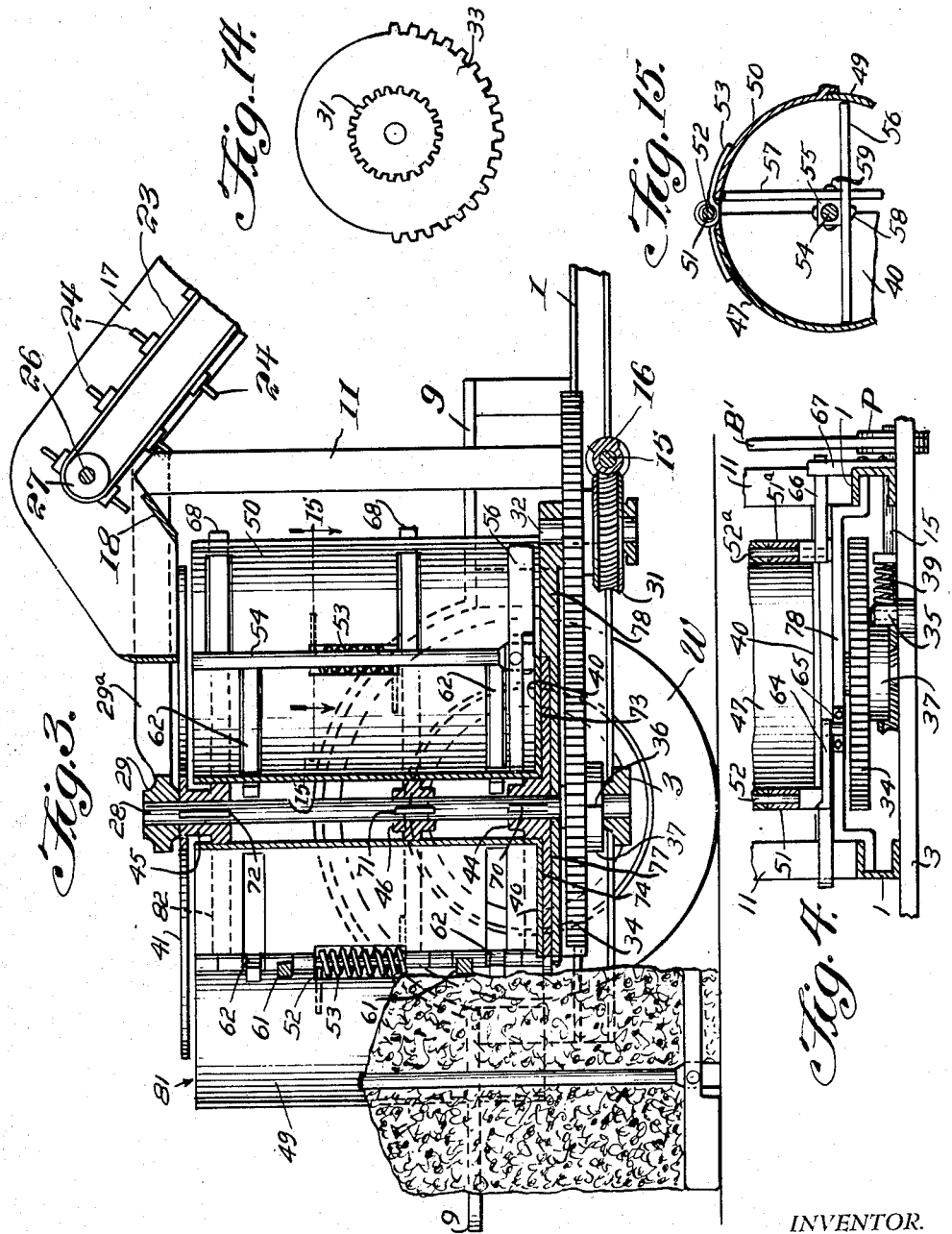

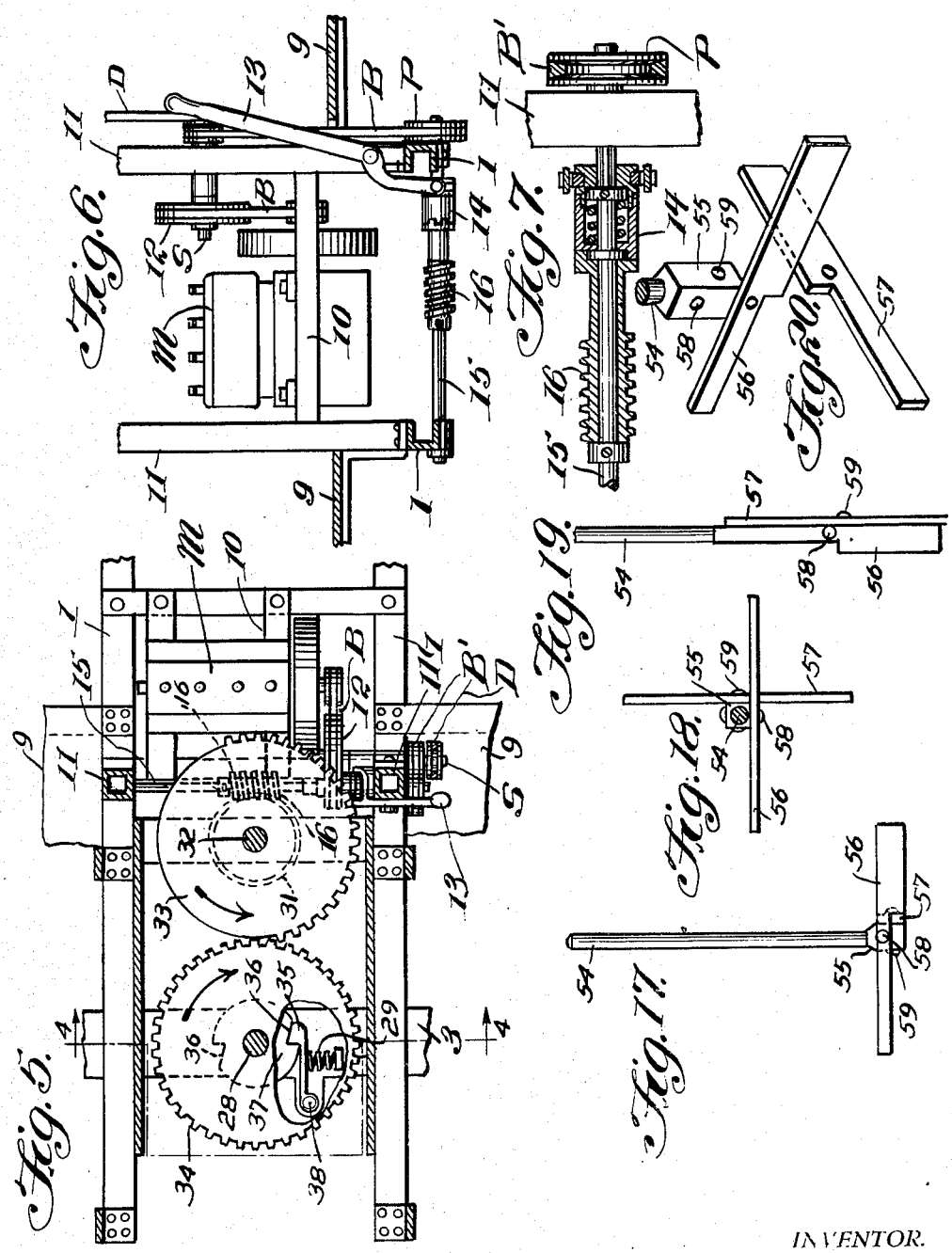

July 11, 1950   J. H. FORIEST   2,514,854
PEANUT STACKER
Filed Oct. 22, 1948   5 Sheets-Sheet 5
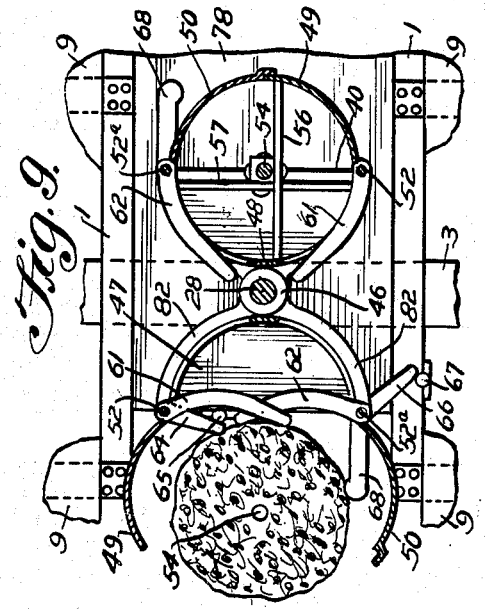
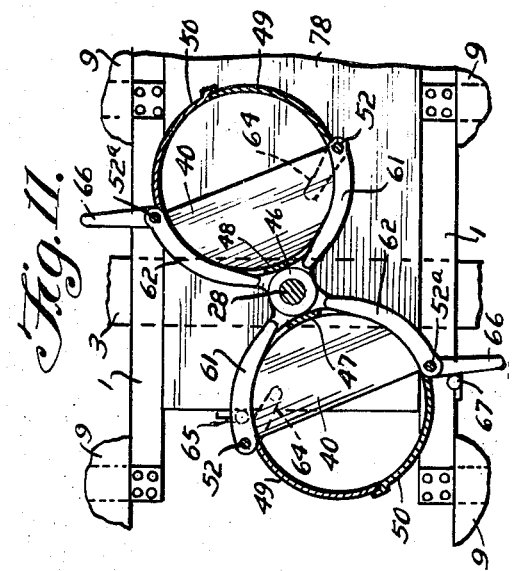
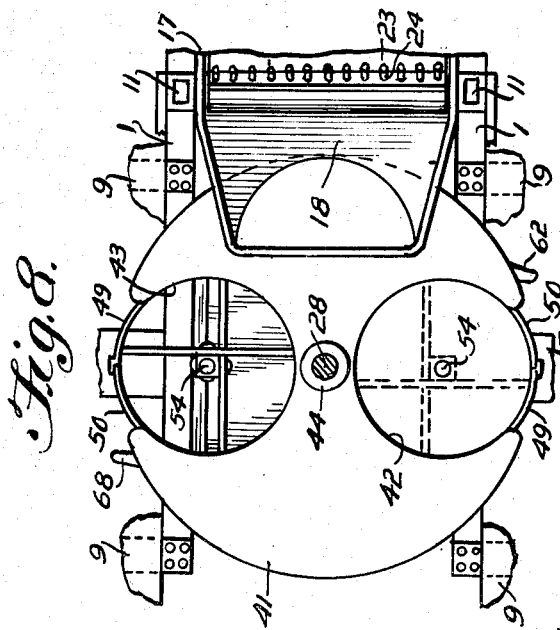
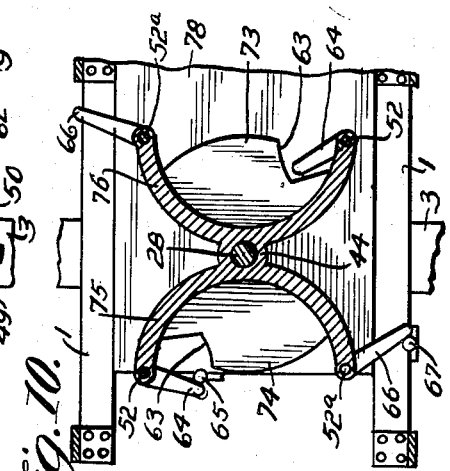
INVENTOR.
John H. Foriest,
BY Victor J. Evans & Co.
ATTORNEYS Patented July 11, 1950

2,514,854

UNITED STATES PATENT OFFICE 2,514,854

PEANUT STACKER

John Henry Foriest, Pendleton, N. C.

Application October 22, 1948, Serial No. 55,997

7 Claims. (Cl. 55—9)

My present invention relates to the general class of harvesting implements of the wheeled vehicle type that is motor operated, and propelled by a towing tractor or other suitable power, and more specifically to an improved portable peanut stacker which while well adapted for harvesting various other vine crops, is especially designed for uprooting and lifting vines with the peanuts from the soil, conveying the uplifted crop to a rotary carrier of a stacking unit where successive charges are compactly bundled in substantially cylindrical stacks or shocks of suitable size, and the completed stacks are successively delivered from the rear end of the implement for subsequent handling and processing.

In carrying out my invention I utilize a multi-tined scoop or shovel, an endless conveyor which receives the uprooted vines and peanuts, and discharges the loaded vines into a stacking unit that includes an upright rotary carrier having diametrically arranged receivers with means for compressing the vines therein, and means for intermittently rotating the stacking unit.

The invention consists in certain novel features of construction and combinations and arrangements of parts as will hereinafter be described, which may with facility be manufactured, and assembled with convenience to constitute a portable implement of this character that is simple in construction, facile in operation, and efficient in the performance of its functions of harvesting the desired crop. In the appended claims I have more particularly set forth the novel features and combinations of my invention, and in the accompanying drawings I have illustrated a complete example of a physical embodiment of my invention wherein the parts are combined and arranged in accord with one mode I have devised for the practical application of the principles of my invention.

It will however be understood that changes and alterations are contemplated and may be made in these exemplifying drawings and mechanical structures, within the scope of my claims, without departing from the principles of the invention.

Figure 1 is a view in side elevation of a portable, tractor-towed implement in which my invention is embodied.

Figure 2 is a top plan view of the implement.

Figure 3 is a vertical longitudinal sectional view of the main and rear portion of the implement, disclosing a completed stack or bale delivered to the ground level.

Figure 4 is a vertical transverse sectional view through the drop frame of the implement at line 4—4 of Fig. 5.

Figure 5 is a top plan view partly in section illustrating the intermittent transmission of power to the rotary stacking unit.

Figure 6 is a transverse vertical sectional view of the main frame showing the manual control for the power output shaft from the operating motor.

Figure 7 is a longitudinal detail sectional view of clutch and driven mechanism on the power output shaft.

Figure 8 is a top plan view with parts broken away showing the intermittently rotated stacking unit showing the relation of the open-bottom discharge spout, and a bale or stack being transferred to the rear end of the implement for delivery; and Figure 9 is a sectional plan view illustrating the release and delivery of the bale or stack.

Figure 10 is a horizontal sectional view of the frame of the dual or duplex receivers, illustrating the actuating lever arms for the ejecting or delivery mechanism of a loaded or completed stack or bale.

Figure 11 is a plan view of the duplex receivers with their hinged gates closed, and the actuating arms in initial position for contact with their abutments for opening the gates and ejecting the stack.

Figures 12 and 13 are plan views of portions of the receiver frames, showing in Figure 13 the bottom shelves of the receivers for supporting the stacks, with guide arms in Fig. 12 for directing the ejected stack outwardly away from the operating parts.

Figure 14 is a detail plan view of the segmental gear or mutilated gear, with its worm gear, for intermittently turning the rotary stacker.

Figure 15 is a fragmentary detail top plan view showing the hinge bolt in section, as at line 15—15 of Fig. 3 and showing the hinged gates of a receiver.

Figure 16 is a detail view in elevation showing the separated sections of the hinged receiver.

Figure 17 is a view in elevation of a spider frame or supporting rack on which the stack of vines is erected; Figure 18 is a top plan view of the spider frame or supporting rack.

Figure 19 is a view in elevation of the collapsible or foldable rack of the spider frame folded as when not in use.

Figure 20 is an exploded perspective view of the lower end spider frame or supporting rack.

In the tractor-towed implement illustrated in the assembly views of the drawings I employ a rectangular longitudinally extending drop-frame 1 preferably of channel irons, having a pair of rear supporting wheels W, W journaled or alined stud axles 2, 2, of a U-shape cross beam 3 located beneath the frame and rigidly united, as by welding, or bolts, with the frame structure.

At the front of the portable implement a pair of castor wheels 4, 4, are swiveled in bearing brackets 5, 5, rigidly attached against the outer faces of the longitudinal side bars of the main frame; and a draft-hitch, or coupling yoke 6, with its draft tongue 7, is pivoted at 8 to the main frame, for coupling the implement at the rear of a towing tractor, or other means for propelling the portable wheeled implement.

For use by workmen or attendants, the main frame is equipped with horizontal steps or plates 9 which provide platforms or working spaces or stations, and the plates are provided with arched fenders as 9A forming protective coverings over the wheels W, W.

For supplying power to the operating parts of the implement, a motor M of suitable type is mounted on a motor-frame 10 that is rigid with the main frame 1, and also rigid with an upright supporting frame 11, and as best seen in Figs. 5 and 6, the mechanism of a belt-drive 12 including shaft S and belt B from the motor, is controlled by an operating hand-lever 13 and clutch mechanism 14 on a power output shaft 15 that is journaled transversely of the implement in bearings of the main frame. The power shaft 15 is equipped with a pulley P driven by the belt B', and a driving worm 16 co-acting with the clutch mechanism initiates power and motion for the intermittently rotated stacking unit located on the rear portion of the frame.

At the front of the main frame an upwardly extending and inclined trough 17 is mounted and supported at its upper end on the upright frame 11, and the upper end of the trough terminates in a rearwardly inclined chute 18.

Pivotally mounted on the lower ends of the trough 17 by a shaft 20 is a multi-tined scoop 19, the shaft 20 being provided with a stop 20' to hold the scoop 19 in vine gathering position. The scoop may be elevated and latched to an inoperative position by hook members 21 mounted at 22 on the sides of the trough 17.

At the rear of the multi-tined scoop gripper, an endless flexible conveyor is mounted in the inclined trough, which includes an endless belt 23 having spiked cross slats 24 that are designed to pick up the vines from the rear of the scoop, and the belt passes around a lower roller 25 journaled in the front end of the trough and also around an upper, power-roller 26 mounted on a transverse shaft 27 that is journaled in bearings at the top of the upright supporting frame 11.

The upper or outer flight of the belt conveyor, which is operated from shaft S by means of a belt drive D to the shaft 27 and its roller 26, picks up the uprooted vines from the scoop as the implement advances across the field, and the vines are conveyed upwardly to the elevated, open-bottom, discharge chute 18.

Through the open bottom of the chute the vines are fed or discharged to one of a pair of duplex or dual receivers of an upright intermittently rotated stacker unit or shocker mechanism mounted on the main frame and positioned to receive the vines and peanuts from the conveyor, and adapted to deliver the compactly bundled vines from the rear of the implement, and to the ground surface.

As best seen in Fig. 3 the intermittently rotated stacker is mounted to revolve with an upright shaft 28 that is journaled at its lower end in the cross beam 3 and also journaled at its upper end in a bearing 29 in a bracket 29a forming the top horizontal portion of the upright supporting frame 11.

The shaft 28 of the stacker unit is intermittently rotated through a half-revolution from the drive worm 16 of the power output shaft 15, through transmission gearing including a worm gear 31 on an upright jack shaft or stub shaft 32, that meshes with the worm 16, an interrupted or mutilated gear 33 on the shaft 32, and a spur gear 34 fixedly mounted on the shaft 28, and located below the deck or floor of the implement.

During an idle period while vines are being delivered to the stacker and a stack is being delivered at the rear of the implement, as in Fig. 2, the stacker is frictionally held stationary by means of a detent 35 that engages one of the notches 36 in a disk 37 which rotates with the shaft 28, and the detent is pivoted at 38 on a fixed support beneath the gear 34, and held by a spring 39.

This detent automatically releases from the notched disk in suitable manner, and at regular intervals, as the mutilated gear, or segmental gear 33, rotates the spur gear 34.

The upright intermittently rotated carrier 81 which has two vine-receivers of the stacker mechanism includes a flat, horizontally disposed circular upper plate 41 located under the chute 18, and this plate is cut out to form two diametrically arranged circular openings or receiving ports 42 and 43 which open outwardly through the circumferential edge of the plate.

The rotary carrier is provided with a central hub 44 that is fixedly mounted on the lower end of the shaft 28, and at the upper end of the shaft the hub 45 of the plate 41 is mounted. The two hubs with the intermediate hub 46 support the stack or shock receiving elements from the shaft 28, and these are keyed to the shaft by keys 70, 71 and 72. The lower hub 44 carries two diametrically opposed segments 73 and 74 which have side flanges 75 and 76 at the edges as shown in Figure 10, and two diametrically opposed semi-cylindrical or concave walls 47 and 48, and these walls are provided with pairs of hinged gates 49 and 50, which when closed, together with the concaves or fixed walls 47 and 48 and the bottom shelves or platforms 40 form cylindrical receivers. These receivers are similar and the same reference characters apply to both. These receivers are alternately positioned beneath the openings 42 and 43 in the plate 41, and also below the open-bottom discharge chute through which the vines and peanuts are discharged, and the inflowing crop is packed or stacked in one receiver while a completed stack is being delivered from the other receiver.

The segments 73 and 74 are positioned to travel through a recess 77 in a base plate 78 in which the stub shaft 32 is journaled and through which the vertical shaft 28 passes.

Each of the four gates or folding walls has vertically spaced hinge joints 51 and 51a on upright hinge bolts 52 and 52a and the bolts are equipped with springs 53 that automatically close the gates as the receivers are turned to positions for receiving the vines.

As indicated in Figs. 17 to 20, the vines are stacked upon a collapsible, or foldable, supporting rack or spider frame which includes a central upright post 54 upon the base 55 of which a pair of diametrically arranged cross bars 56 and 57 are pivoted at 58 and 59 respectively, and fashioned to such shapes, in order that they may form a base, when extended, for the formation of the stack. In extended position, the supporting rack or spider frame is set in the center of the receiver and on the shelf 40.

One stack is formed while another stack is being delivered to the ground, and for delivery of the completed stack the pair of closed gates 49 and 50 are automatically opened as the rotary stacker carries the completed stack to delivery position at the rear of the implement. For this purpose and as indicated best in Figs. 8, 9, and 10, the gates 49 and 50 are equipped with horizontally disposed pairs of ejectors or lever arms 61 and 62 mounted on the hinge belts 52 and 52a, to aid in pushing the completed stacks from the bottom shelf or platform 40 of the receivers as the stacker rotates or is turned to bring a loaded receiver to delivery position.

Gate 49 is swung open by co-action of an actuating arm 64 positioned in a recess 63 in the segments 73 and 74 and provided with a fixed abutment or pin 65 located in the path of the arm and projecting upwardly from the frame or floor of the implement, as shown in Figs. 10 and 11.

Gate 50 is also automatically opened, and its ejector arm 62 aids in the delivery of the stack as its actuating arm 66 encounters or contacts with an abutment or fixed pin 67, and the ejected stack is guided rearwardly by means of guide arms 68 projecting outwardly from the hubs on the shaft 28.

The upper plate 41 rotates with the stacker elements, functioning as a sliding gate, cutting off the supply of vines dropping from the chute 18 into the stacker elements and holding the vines until another stack section of the device has arrived in the receiving position.

It will be noted that as the stacked carrier rotates in a counter-clockwise direction the arm 64 will pass the projection 67 so that the gate 49 actuated thereby will not open until the arm 64 engages the projection 65 and opens its gate 49.

Thus, after the ejection or delivery of a completed stack, the gates are automatically closed by their springs, and when the constantly rotating segmental gear again engages the large spur gear of the rotary stacker, the empty receiver is turned to position under the discharge chute, while a loaded receiver is turned to delivery or ejection position, as the implement advances along the crop of vines and peanuts.

Having thus fully described my invention, what I claim as new and desire to secure by Letters Patent is:

1. The combination in a portable motor-operated vine-stacking implement having a front vine pulling appliance, an upwardly inclined endless conveyor, and an open-bottom discharge chute, of an upright intermittently rotating carrier having diametrically arranged receivers adapted to alternately stand beneath the chute for the reception of vines, means for ejecting a completed stack from each receiver, and constantly operating rotary mechanism for intermittently rotating the carrier.

2. The combination in a portable motor-operated vine-stacking implement having a front vine gripping appliance, and an upwardly inclined endless conveyor having an upper discharge chute, of an upright rotary carrier having diametrically arranged receivers adapted for coaction with the chute, a spur gear rotatable with the carrier, a segmental gear having intermittent co-action with the spur gear, and motor-operated transmission mechanism for constantly rotating the spur gear.

3. In a motor-operated vine-harvester, the combination with a front upwardly inclined endless conveyor and operating means therefor, a multi-tined scoop mounted in front of the conveyor, and an open-bottom discharge chute at the upper rear end of the conveyor, of an upright intermittently rotating carrier and constantly rotating motor-operated mechanism for intermittently rotating the carrier, said carrier having diametrically arranged receivers each having a delivery port, a pair of hinged gates for each receiver, and automatically operated means for opening said gates for delivery of a completed stack.

4. In a motor-operated vine-harvester, the combination with a front upwardly inclined endless conveyor, a multi-tined scoop mounted in front of the conveyor, and an open bottom discharge chute at the upper end of the conveyor, of an upright intermittently rotating carrier having duplex receivers and motor-operated means for operating the carrier, a pair of resiliently closed hinged-gates for each receiver, and automatic means actuated by the rotating carrier for opening said gates for the delivery of a completed stack.

5. In a portable motor-operated vine harvester including an intermittently rotated carrier, means for operating the carrier, and means for feeding vines to the carrier, of oppositely disposed semi-cylindrical walls rigid with the carrier, a pair of hinged gates mounted on each wall to form cylindrical receivers, resilient means for closing said gates, and means actuated by rotary movement of the carrier for automatically opening said gates.

6. In a portable motor-operated vine-harvester, the combination with an intermittently rotated stacker unit including oppositely disposed semi-cylindrical and rigid walls, of a pair of spring-pressed gates mounted on each wall, means actuated intermittently by the rotary stacker for opening said gates, and ejecting means also actuated intermittently by the rotary stacker for ejecting a completed stack from the carrier.

7. In a rotary stacker unit, the combination with an intermittently rotating carrier having opposed receivers, of a pair of gates hinged to each receiver, springs for resiliently closing the gates, a pivotal ejecting arm co-acting with each gate and means for actuating said arm, and means intermittently actuated by the rotating carrier for opening the gates to permit delivery of a completed stack.

JOHN HENRY FORIEST.

REFERENCES CITED

The following references are of record in the file of this patent:

UNITED STATES PATENTS

| Number | Name | Date |
| --- | --- | --- |
| 1,197,762 | Pitts | Sept. 12, 1916 |
| 1,335,419 | Baxter | Mar. 30, 1920 |
| 1,381,211 | Maulsby | June 14, 1921 |
| 1,704,190 | Hall | Mar. 5, 1929 |
| 2,328,790 | Dorsey | Sept. 7, 1943 |
| 2,372,586 | Kraus | Mar. 27, 1945 |
| 2,379,371 | Moschel | June 26, 1945 |